US010086362B2

(12) United States Patent
Kim et al.

(10) Patent No.: US 10,086,362 B2
(45) Date of Patent: Oct. 2, 2018

(54) PREPARATION METHOD OF SUPER ABSORBENT POLYMER (71) Applicant: LG Chem, Ltd., Seoul (KR)

(72) Inventors: Dong Hyun Kim, Daejeon (KR); Chang Sun Han, Daejeon (KR); Dae Woo Nam, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/540,705

(22) PCT Filed: Nov. 1, 2016

(86) PCT No.: PCT/KR2016/012461
§ 371 (c)(1),
(2) Date: Jun. 29, 2017

(87) PCT Pub. No.: WO2017/078369
PCT Pub. Date: May 11, 2017

(65) Prior Publication Data
US 2017/0354952 A1 Dec. 14, 2017

(30) Foreign Application Priority Data

Nov. 3, 2015 (KR) .......... 10-2015-0153879
Oct. 31, 2016 (KR) .......... 10-2016-0142887

(51) Int. Cl.
C08J 3/12 (2006.01)
B01J 20/30 (2006.01)
C08F 2/10 (2006.01)
C08J 3/075 (2006.01)
B01J 20/26 (2006.01)
C08F 220/00 (2006.01)
C08J 3/24 (2006.01)
C08F 2/50 (2006.01)
C08F 6/00 (2006.01)
B01J 20/28 (2006.01)

(52) U.S. Cl.
CPC ......... B01J 20/3028 (2013.01); B01J 20/267 (2013.01); B01J 20/28047 (2013.01); B01J 20/3021 (2013.01); B01J 20/3085 (2013.01); C08F 2/10 (2013.01); C08F 2/50 (2013.01); C08F 6/008 (2013.01); C08F 220/00 (2013.01); C08J 3/075 (2013.01); C08J 3/12 (2013.01); C08J 3/245 (2013.01); B01J 2220/68 (2013.01); C08J 2300/14 (2013.01); C08J 2333/00 (2013.01)

(58) Field of Classification Search
CPC .................................................. B01J 20/3028
See application file for complete search history.

(56) References Cited

U.S. PATENT DOCUMENTS

| 4,446,261 A | 5/1984 | Yamasaki et al. |
| 5,122,544 A | 6/1992 | Bailey et al. |
| 5,514,754 A | 5/1996 | Henderson et al. |
| 6,133,193 A * | 10/2000 | Kajikawa ........... B29B 9/06 428/402 |
| 2003/0008946 A1* | 1/2003 | Dairoku ........... A61L 15/60 523/201 |
| 2004/0249120 A1 | 12/2004 | Nagasawa et al. |
| 2015/0259522 A1* | 9/2015 | Lee ........... B01J 20/261 524/522 |
| 2016/0045895 A1 | 2/2016 | Won et al. |
| 2016/0175813 A1 | 6/2016 | Ryu et al. |
| 2016/0332143 A1 | 11/2016 | Sim et al. |

FOREIGN PATENT DOCUMENTS

| EP | 0455846 A1 | 11/1991 |
| EP | 0789047 A1 | 8/1997 |
| EP | 0812873 A1 | 12/1997 |
| EP | 0885917 A2 | 12/1998 |
| EP | 2787025 A1 | 10/2014 |
| JP | S56161408 A | 12/1981 |
| JP | S57158209 A | 9/1982 |
| JP | S57198714 A | 12/1982 |
| JP | H11-106514 A | 4/1999 |
| JP | 2005015787 A | 1/2005 |
| JP | 4199330 B2 | 12/2008 |
| KR | 20140063457 A | 5/2014 |

(Continued)

OTHER PUBLICATIONS

Translation of KR 2014-0145810 (2014) (Year: 2014).*
International Search Report for Application No. PCT/KR2016/012461 dated Feb. 6, 2017.
Odian, G., "Principles of Polymerization", 1981, p. 203, Second Edition, A Wiley-Interscience Publication.
Schwalm, Reinhold, "UV Coatings: Basics, Recent Developments and New Applications", Elsevier Science, Dec. 21, 2006, p. 115.
Bucholz et al., "Modern Superabsorbent Polymer Technology", Wiley-VCH, pp. 69-103, Fig.3.1, 1998.
Third Party Observation for PCT/KR2016/012461 dated Mar. 1, 2018.

(Continued)

Primary Examiner — Robert C Boyle
(74) Attorney, Agent, or Firm — Lerner, David, Littenberg, Krumholz & Mentlik, LLP (57) ABSTRACT The present invention relates to a manufacturing method of a super absorbent polymer including: carrying out a thermal polymerization or a photopolymerization of a monomer composition including a water-soluble ethylene-based unsaturated monomer and a polymerization initiator to form a hydrogel polymer; drying the hydrogel polymer; pulverizing the dried polymer; classifying the pulverized polymer into a fine powder having a particle diameter of less than 150 μm and a polymer having a particle diameter of 150 to 850 μm according to the particle diameter; performing reassembly to form a fine powder reassembly; and mixing the polymer having a particle diameter of 150 to 850 μm with the fine powder reassembly, followed by surface cross-linking.

8 Claims, 3 Drawing Sheets (56) References Cited

FOREIGN PATENT DOCUMENTS

| KR | 20140145810 A | 12/2014 | | |
|----|---------------|---------|---|---|
| KR | 20150024767 A | 3/2015 | | |
| KR | 20150032045 A | 3/2015 | | |
| KR | 20150068321 A | 6/2015 | | |
| KR | 20150082123 A | 7/2015 | | |
| WO | WO-2006/101271 A1 * | 9/2006 | ............... | C08J 3/12 |
| WO | 2009031701 A1 | 3/2009 | | |
| WO | WO 2014/077612 * | 5/2014 | | |
| WO | 2015163519 A1 | 10/2015 | | |

OTHER PUBLICATIONS

Extended European Search Report including Written Opinion for Application No. EP16862385.8 dated Jun. 27, 2018.

* cited by examiner

PREPARATION METHOD OF SUPER ABSORBENT POLYMER

CROSS-REFERENCE TO RELATED APPLICATION

The present application is a national phase entry under 35 U.S.C. § 371 of International Application No. PCT/KR2016/012461 filed on Nov. 1, 2016, which claims priority from Korean Patent Application No. 10-2015-0153879 filed on Nov. 3, 2015, and Korean Patent Application No. 10-2016-0142887 filed on Oct. 31, 2016, all of which are incorporated herein by reference.

TECHNICAL FIELD

The present invention relates to a method for preparing a super absorbent polymer. More specifically, the present invention relates to a method for preparing a super absorbent polymer having a high fine aggregation strength.

BACKGROUND ART

A super absorbent polymer (SAP) is a synthetic polymeric material capable of absorbing water five hundred up to one thousand times the mass of its own. The SAP is called by different names according to the developers, for example, a super absorbency material (SAM), an absorbent gel material (AGM), and the like.

Commercial productions of the SAP began for use in feminine hygiene napkins, nowadays, the use of SAP may be found in a very wide range of applications, including water combination soils for gardening, water-stop materials for engineering and construction, sheets for raising seeding, freshness-keeping agents in the food distribution field, and materials for sweating rooms, as well as personal hygiene products, such as disposable baby diapers.

Known preparation methods for SAP include an inverse suspension polymerization method or an aqueous solution polymerization method.

The method using inverse suspension polymerization is disclosed in, for example, JP S-56-161408, JP S-57-158209 and JP S-57-198714.

The method using aqueous solution polymerization includes several methods: a thermal polymerization method including polymerization of a hydrated gel polymer by shearing and freezing in a kneading machine provided with several spindles, and a photopolymerization method using UV radiations on a high-concentration aqueous solution on a conveyer belt to perform both polymerization and drying at once.

A hydrogel polymer obtained through the polymerization reaction as described above is generally pulverized through a drying process, and then commercially available as a powdery product.

Here, during cutting, milling and pulverization of the dried polymer, a fine powder having a particle size of about 150 μm or less may occur.

When super absorbent polymer particles prepared by including the fine powder is applied to products, they may exhibit physical properties that are shifted or lowered before use, and thus, the fine powder is considered to be undesirable in hygiene articles including infant diapers and urinary incontinence equipment for adults.

Thus, a reassembling process in which the fine powder is excluded so as not to include the fine powder in a final resin product or the fine powder is aggregated to have a normal particle size. In many cases, the reassembled polymer is crushed into a fine powder again due to a low aggregation strength.

Therefore, there is still a need for a manufacturing method of a super absorbent polymer capable of having a high fine aggregation strength to reduce a fine occurrence rate of the reassembled polymer.

DETAILED DESCRIPTION OF THE INVENTION

Technical Problem

It is an object of the present invention to provide a method for preparing a super absorbent polymer having improved permeability without reduction in water retention capacity or absorbency under pressure by increasing aggregation strength of a fine reassembly.

Technical Solution

The present invention provides a method for preparing a super absorbent polymer, comprising the steps of: carrying out a thermal polymerization or a photopolymerization of a monomer composition including a water-soluble ethylene-based unsaturated monomer and a polymerization initiator to form a hydrogel polymer; drying the hydrogel polymer; pulverizing the dried polymer; classifying the pulverized polymer into a fine powder having a particle diameter of less than 150 μm and a polymer having a particle diameter of 150 to 850 μm according to the particle diameter; performing reassembly by mixing and wetting the fine powder with 5 to 30° C. water in a content of 50 to 200 parts by weight with respect to 100 parts by weight of the fine powder having a particle size of 150 μm or less, to form a fine powder reassembly; and mixing the polymer having a particle diameter of 150 to 850 μm with the fine powder reassembly, followed by surface cross-linking.

Hereinafter, a method for preparing a super absorbent polymer according to a specific embodiment of the present invention is described in more detail.

According to an exemplary embodiment of the present invention, a method for preparing a super absorbent polymer may comprise the steps of: carrying out a thermal polymerization or photopolymerization of a monomer composition including a water-soluble ethylene-based unsaturated monomer and a polymerization initiator to form a hydrogel polymer; drying the hydrogel polymer; pulverizing the dried polymer; classifying the pulverized polymer into a fine powder having a particle diameter of less than 150 μm and a polymer having a particle diameter of 150 to 850 μm according to the particle diameter; performing reassembly by mixing and wetting the fine powder with 5 to 30° C. water in a content of 50 to 200 parts by weight with respect to 100 parts by weight of the fine powder having a particle size of 150 μm or less, to form a fine powder reassembly; and mixing the polymer having a particle diameter of 150 to 850 μm with the fine powder reassembly, followed by surface cross-linking.

In the method for preparing the super absorbent resin according to an exemplary embodiment, the monomer composition which is a raw material of the super absorbent polymer includes the water-soluble ethylene-based unsaturated monomer and the polymerization initiator.

The water-soluble ethylene-based unsaturated monomer may be any monomer generally used in preparation of the super absorbent polymer without any particular limitations.

Here, the water-soluble ethylene-based unsaturated monomer may be at least any one selected from the group consisting of anionic monomers and salts thereof, nonionic hydrophile-containing monomers, and unsaturated monomers containing amino groups, and quarternary compounds thereof.

Specifically, the water-soluble ethylene-based unsaturated monomer may be at least any one selected from the group consisting of anionic monomers such as methacrylic acid, anhydrous maleic acid, fumaric acid, crotonic acid, itaconic acid, 2-acryloyl ethane sulfonic acid, 2-methacryloyl ethane sulfonic acid, 2-(meth)acryloyl propane sulfonic acid, or 2-(meth)acrylamide-2-methyl propane sulfonic acid, and salts thereof; nonionic hydrophile-containing monomers such as (meth)acrylamide, N-substituted(meth)acrylate, 2-hydroxyethyl(meth)acrylate, 2-hydroxypropyl(meth)acrylate, methoxypolyethylene glycol(meth)acrylate, or polyethylene glycol(meth)acrylate; and unsaturated monomers containing amino groups such as (N,N)-dimethylaminoethyl (meth)acrylate, or (N,N)-dimethylaminopropyl(meth) acrylamide, and quarternary compounds thereof.

More preferably, the acrylic acid or salts thereof, for example, an acrylic acid or alkali metal salts such as sodium salts thereof may be used. By using the monomer, it is possible to manufacture a super absorbent polymer having more excellent physical properties. When the alkali metal salt of the acrylic acid is used as the monomer, the acrylic acid may be neutralized with a basic compound such as caustic soda (NaOH) and used.

A concentration of the water-soluble ethylene-based unsaturated monomer may be about 20 to about 60 wt %, preferably about 40 to about 50 wt %, based on the monomer composition including a raw material and a solvent of the super absorbent polymer, and may be controlled in consideration of polymerization time and reaction condition, etc. However, when the concentration of the monomer is excessively low, the super absorbent polymer may have a low yield and have an economical problem. On the other hand, when the concentration thereof is excessively high, process problems may occur, for example, a part of the monomer may precipitate, pulverization efficiency may be low at the time of pulverizing the polymerized hydrogel polymer, etc., and physical properties of the super absorbent polymer may be deteriorated.

Further, the polymerization initiator is not particularly limited as long as it is generally used in manufacture of the super absorbent polymer. A thermal polymerization initiator or a photopolymerization initiator according to UV irradiation may be used depending on a polymerization method. Meanwhile, even if the photopolymerization method is performed, the thermal polymerization initiator may be additionally included since a predetermined amount of heat occurs by ultraviolet irradiation, etc., and in addition, as the polymerization reaction which is an exothermic reaction proceeds, some degree of heat occurs.

The photopolymerization initiator may be used without limitation in view of constitution as long as it is a compound capable of forming a radical by light such as ultraviolet rays.

The photopolymerization initiator may be, for example, at least one selected from the group consisting of benzoin ether, dialkyl acetophenone, hydroxyl alkylketone, phenyl glyoxylate, benzyl dimethyl ketal, acyl phosphine, and α-aminoketone. Meanwhile, as a specific example of the acylphosphine, a commonly used lucirin TPO, that is, 2,4, 6-trimethyl-benzoyl-trimethyl phosphine oxide may be used. More various photo-polymerization initiators are well described in "UV Coatings: Basics, Recent Developments and New Application (Elsevier, 2007)", page 115, written by Reinhold Schwalm. However, the present invention is not limited to the above-described examples.

The photopolymerization initiator may be included at a concentration of about 0.01 to about 1.0 wt % based on the monomer composition. When the concentration of the photopolymerization initiator is excessively low, a polymerization speed may be reduced. When the concentration of the photopolymerization initiator is excessively high, a molecular weight of the super absorbent polymer may be small and physical properties thereof may be non-uniform.

In addition, the thermal polymerization initiator may be at least one selected from the group consisting of a persulfate-based initiator, an azo-based initiator, hydrogen peroxide, and an ascorbic acid Specifically, examples of the persulfate-based initiator may include sodium persulfate ($Na_2S_2O_8$), potassium persulfate ($K_2S_2O_8$), ammonium persulfate (($NH_4)_2S_2O_8$), and the like, and examples of the azo-based initiator may include 2,2-azobis(2-amidinopropane)dihydrochloride, 2,2-azobis-(N,N-dimethylene)isobutyramidine dihydrochloride, 2-(carbamoylazo)isobutylonitril, 2,2-azobis[2-(2-imidazolin-2-yl) propane]dihydrochloride, 4,4-azobis-(4-cyanovaleric acid), and the like. More various thermal initiators are well described in "Principle of Polymerization (Wiley, 1981)", page 203, written by Odian. However, the present invention is not limited to the above-described examples.

The thermal polymerization initiator may be included at a concentration of about 0.001 to about 0.5 wt % based on the monomer composition. When the concentration of the thermal polymerization initiator is excessively low, additional thermal polymerization is hardly performed, and thus, an effect of addition of the thermal polymerization initiator may be insignificant. When the concentration of the thermal polymerization initiator is excessively high, the molecular weight of the super absorbent polymer may be small and physical properties thereof may be non-uniform.

In addition, the monomer composition may further include an internal cross-linking agent as a raw material for the super absorbent polymer. As the internal cross-linking agent, a cross-linking agent having at least one functional group capable of reacting with a water-soluble substituent of the water-soluble ethylene-based unsaturated monomer while having at least one ethylenically unsaturated group; or a cross-linking agent having at least two functional groups capable of reacting with the water-soluble substituent of the monomer and/or a water-soluble substituent formed by hydrolysis of the monomer, may be used.

Specific examples of the internal cross-linking agent may include C8-C12 bisacrylamide, bismethacrylamide, poly (meth)acrylate of C2-C10 polyol or poly(meth)allylether of C2-C10 polyol, and more specifically, at least one selected from the group consisting of N,N'-methylenebis(meth)acrylate, ethyleneoxy(meth)acrylate, polyethyleneoxy(meth) acrylate, propyleneoxy(meth)acrylate, glycerin diacrylate, glycerin triacrylate, trimethylol triacrylate, triallyl amine, triallyl cyanurate, triallyl isocyanate, polyethylene glycol, diethylene glycol, and propylene glycol.

The internal cross-linking agent may be included at a concentration of about 0.01 to about 0.5 wt % based on the monomer composition, thereby cross-linking the polymerized polymer.

Further, the monomer composition of the manufacturing method of the super absorbent polymer according to an exemplary embodiment may further include additives such as a thickener, a plasticizer, a storage stabilizer, an antioxidant, etc., if necessary.

The above-described raw materials such as the water-soluble ethylenically unsaturated monomer, the photopolymerization initiator, the thermal polymerization initiator, the internal cross-linking agent, and the additives may be prepared in a form of a monomer composition solution dissolved in a solvent.

Here, the solvent that is usable without limitation in view of constitution as long as it is capable of dissolving the above-described components. For example, the solvent may be used in combination of at least one selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethyl ether, toluene, xylene, butyrolactone, carbitol, methylcellosolve acetate, and N,N-dimethylacetamide, etc.

The solvent may be included in a residual content excluding the above-described components with respect to the total content of the monomer composition.

Meanwhile, a method of forming the hydrogel polymer by thermal polymerization or photopolymerization of such a monomer composition is not particularly limited in view of constitution as long as it is a generally used polymerization method.

Specifically, the polymerization method is largely divided into thermal polymerization and photopolymerization depending on a polymerization energy source. It is general the thermal polymerization may be performed in a reactor having an agitator shaft such as a kneader, and the photopolymerization may be performed in a reactor equipped with a movable conveyor belt. However, these above-described polymerization methods are described by way of example, and the present invention is not limited to the above-described polymerization methods.

For example, the hydrogel polymer obtained by supplying hot air to the reactor such as the kneader equipped with the agitator shaft as described above, or heating the reactor to perform the thermal polymerization may be discharged to a reactor outlet according to a form of the agitator shape provided in the reactor, and may have a size of several centimeters to several millimeters. Specifically, the size of the obtained hydrogel polymer may vary depending on the concentration, an injection speed, etc., of the monomer composition to be injected. Generally, the hydrogel polymer may have a weight average particle diameter of 2 to 50 mm.

In addition, when the photopolymerization is performed in the reactor provided with the movable conveyer belt as described above, the generally obtained hydrogel polymer may be a sheet-shaped hydrogel polymer having a width of the belt. Here, the thickness of the polymer sheet varies depending on the concentration and the injection speed of the monomer composition to be injected, but it is preferred to supply the monomer composition so that it is possible to obtain the sheet-shaped polymer having a thickness of generally about 0.5 to about 5 cm. When supplying the monomer composition such an extent that the thickness of the sheet-shaped polymer has an excessively thin thickness, it is not preferred since production efficiency may be low. When the thickness of the sheet-shaped polymer is more than 5 cm, the polymerization reaction may not be uniformly performed throughout an overall thickness due to the excessively thick thickness.

Here, a moisture content of the hydrogel polymer obtained by this method may be generally about 30 to about 70 wt %, and preferably about 40 to about 60 wt %.

Meanwhile, throughout the present specification, the term "moisture content" refers to a content of moisture occupied with respect to the total weight of the hydrogel polymer, and means a value obtained by subtracting a weight of a dried polymer from the weight of the hydrogel polymer. Specifically, the moisture content is defined as a value calculated by measuring a weight loss due to moisture evaporation in the polymer during a drying process by raising temperature of the polymer through infrared heating. Here, the moisture content is measured under drying conditions in which a temperature is raised from room temperature up to about 180° C., and then the temperature is maintained at 180° C., wherein a total drying time is set as 20 minutes, including 5 minutes for a temperature rising step.

Next, the obtained hydrogel polymer is dried.

Here, if necessary, coarse pulverization may be further performed before the drying to increase an efficiency of the drying step.

Here, a pulverizer to be used is not limited in view of constitution, but specifically, may include any one selected from pulverizing devices groups consisting of a vertical pulverizer, a turbo cutter, a turbo grinder, a rotary cutter mill, a cutter mill, a disc mill, a shred crusher, a crusher, a chopper, and a disc cutter, and is not limited to the above-described examples.

Here, the pulverizing step may be performed so that a particle diameter of the hydrogel polymer is about 2 to about 10 mm. It is not technically easy to pulverize to have the particle diameter of less than 2 mm due to the high moisture content of the hydrogel polymer, and pulverized particles may aggregate with each other. On the other hand, when the pulverization is performed to have the particle diameter of more than 10 mm, an effect of increasing the efficiency of the drying step may not be significant.

The hydrogel polymer which is pulverized as described above or which is formed immediately after the polymerization without performing the pulverization is subjected to drying. Here, a drying temperature of the drying step may be about 150 to about 250° C. When the drying temperature is less than 150° C., a drying time may be excessively increased, and physical properties of the finally formed super absorbent polymer may be deteriorated, and when the drying temperature is more than 250° C., only a surface of the polymer may be excessively dried, such that fine powders may occur in the subsequent pulverization process and physical properties of the finally formed super absorbent polymer may be deteriorated. Accordingly, preferably, the drying may be performed at a temperature of about 150 to about 200° C., and more preferably, about 160 to about 180° C.

Meanwhile, the drying may be performed for about 20 to about 90 minutes in consideration of process efficiency, etc., but time required for the drying is not limited thereto.

In addition, any drying method of the drying step may be used without limitation in view of constitution as long as it is generally used as a drying process of the hydrogel polymer. Specifically, the drying step may be performed by hot air supply, infrared irradiation, microwave irradiation, ultraviolet irradiation, etc. A moisture content of the polymer after the drying step is performed may be about 0.1 to about 10 wt %.

Next, the dried polymer obtained by the drying step is subjected to the pulverization step, which is distinguished from the coarse pulverization step so as to have a particle diameter of 2 to about 10 mm. Polymer powder obtained after the pulverization step may have a particle diameter of about 850 μm or less. A pulverizer used to perform the pulverization into the above-described particle size may be specifically a pin mill, a hammer mill, a screw mill, a roll mill, a disc mill, a jog mill, etc., but the present invention is not limited to the above-described examples.

Then, the pulverized polymer is classified into a fine powder having a particle diameter of less than 150 μm and a polymer having a particle diameter of 150 to 850 μm according to the particle diameter.

In the present invention, fine particles having a particle size of a predetermined particle size or less, i.e., less than about 150 μm, are referred to as a super absorbent polymer fine powder, a polymer fine powder, a SAP fine powder or a fine powder (fines). The fine powder may occur during the polymerization process, the drying process, or the pulverization step of the dried polymer. If the fine powder is included in products, it is difficult to handle, and physical properties may be deteriorated, for example, gel blocking phenomenon may occur, etc. Therefore, it is preferred to exclude the fine powder so as not to include the fine powder in the final resin product or to reuse the fine powder to be normal particles.

In the preparation method of an exemplary embodiment, the fine powder having a particle diameter of 150 μm or less is mixed with 5 to 30° C. water to perform reassembly in a wet state.

The 5 to 30° C. water may be mixed in a content of about 50 to 200 parts by weight with respect to 100 parts by weight of the fine powder, and the reassembly step is performed in the wet state to increase an aggregation strength of the fine powder reassembly. Here, as the content of water is high, the aggregation strength of the fine powder is increased. However, in the reassembly process, massive reassembly lumps or reassembly lumps (jelly balls) in a solidly aggregated state since the fine powder partially contain a large amount of moisture may occur, which may cause problems in operation of the subsequent pulverization process. In addition, when the content of water is low, the reassembly process is easy, but the aggregation strength is low, and thus, there are many cases that the polymer is crushed again into fine powder after the reassembly.

Further, the reassembly step may be performed by adding water having a low temperature of about 5 to 30° C. to form a wet state in which the fine powder have the above-described moisture content. Here, the water having a low temperature increase the aggregation strength of the assembly, thereby having an advantage in that a refined ratio after the drying and the pulverization processes is reduced as compared to when water having a high temperature of about 60° C. or more is used.

Here, the fine powder may be mixed and wetted with the 5 to 30° C. water using a mist, a spray nozzle, etc.

In addition, the reassembly step, the fine powder may be reassembled in a wet state in which the moisture content is about 40 to 60 wt %. As described above, when the fine powder and water are mixed at an appropriate ratio, the fine powder may be wetted at the moisture content of about 40 to 60 wt %, and in this state, the fine powder may be reassembled to manufacture a fine powder reassembly having higher aggregation strength.

Next, the polymer having a particle diameter of 150 to 850 μm is mixed with the fine powder reassembly to perform surface cross-linking.

The polymer having a particle diameter of 150 to 850 μm is derived from the step of classifying the pulverized polymer according to the particle diameter, and corresponds to a polymer having a normal particle diameter range. The fine powder reassembly means a reassembly in which the fine powder having a particle diameter of less than 150 μm derived from the classifying step are reassembled by the above-described method.

Here, the fine powder reassembly may be used in a state derived from the fine powder reassembly process, or may be used in a state in which the fine powder reassembly is subjected to the drying, pulverizing and classifying processes.

When the fine powder reassembly is used in the state in which the fine powder reassembly is subjected to the drying, pulverizing and classifying processes, the drying, pulverizing and classifying processes of the fine powder reassembly may be applied without limitation to processes of drying, pulverizing and classifying the hydrogel polymer as described above.

In addition, the polymer having a particle diameter of 150 to 850 μm and the fine powder reassembly may be mixed at a weight ratio of about 6:4 to 8:2. Here, the mixing ratio is not particularly limited. However, as the ratio of the fine powder reassembly increases, physical properties are lowered as compared to when only the polymer having a normal particle diameter range is used. Therefore, it is preferred that the content of the fine powder reassembly does not exceed 30 wt % or more.

Further, the surface cross-linking step is to increase a cross-linking density near a surface of the super absorbent polymer particles in relation to a cross-linking density in the particle. In general, a surface cross-linking agent is applied to the surface of the super absorbent polymer particles. Thus, this reaction is generated on the surface of the super absorbent polymer particles, which improves crosslinkability on the surface of the particles without substantially affecting an inside of the particles. Thus, surface cross-linked super absorbent polymer particles have a higher cross-linking degree in the vicinity of the surface than in the inside.

Here, the surface cross-linking agent is not limited in view of constitution as long as it is a compound capable of reacting with a functional group of the polymer.

Preferably, in order to improve properties of the super absorbent polymer to be manufactured, the surface cross-linking agent may include at least one selected from the group consisting of a polyhydric alcohol compound; an epoxy compound; a polyamine compound; a haloepoxy compound; a condensation product of the haloepoxy compound; oxazoline compounds; mono-, di- or polyoxazolidinone compound; a cyclic urea compound; a polyvalent metal salt; and an alkylene carbonate compound.

Specific examples of the polyhydric alcohol compound may include at least one selected from the group consisting of mono-, di-, tri-, tetra- or polyethylene glycol, monopropylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexane dimethanol.

Further, the epoxy compound may be ethylene glycol diglycidyl ether and glycidol, etc. The polyamine compound may be at least one selected from the group consisting of ethylene diamine, diethylene triamine, triethylene tetramine, tetraethylene pentamine, pentaethylene hexamine, polyethylene imine, and polyamide polyamine.

Further, the haloepoxy compound may be epichlorohydrin, epibromohydrin, and α-methyl epichlorohydrin. Meanwhile, examples of the mono-, di- or polyoxazolidinone compound may include 2-oxazolidinone, etc.

In addition, examples of the alkylene carbonate compound may include ethylene carbonate, etc.

Meanwhile, in order to minimize the formation of assemblers after surface cross-linking and to increase the surface cross-linking efficiency, it is preferred to include at least one alkylene carbonate compound, and more preferably, ethylene carbonate, among the surface cross-linking agents.

The content of the surface cross-linking agent to be added may be appropriately selected depending on the kind of the surface cross-linking agent to be added and reaction conditions, but generally, may be about 0.001 to 5 parts by weight, preferably about 0.01 to about 3 parts by weight, and more preferably about 0.05 to about 2 parts by weight with respect to 100 parts by weight of the polymer having a particle diameter of 150 to 850 μm and the fine reassembly.

When the content of the surface cross-linking agent is excessively small, a surface cross-linking reaction hardly occurs. When the content of the surface cross-linking agent is more than 5 parts by weight with respect to 100 parts by weight of the polymer, absorption capacity and physical properties may be deteriorated due to excessive surface cross-linking reaction.

Further, the surface cross-linking step may be performed at a temperature of 150° C. to 300° C. for 10 minutes to 100 minutes. That is, the surface cross-linking reaction may be performed by heating a mixture of the polymer having a particle diameter of 150 to 850 μm and the fine powder reassembly to which the surface cross-linking agent is added, and a drying step may be performed together with this reaction.

The means of raising the temperature for the surface cross-linking reaction is not particularly limited. The mixture may be heated by supplying thermal media or directly supplying heat sources. Here, examples of the thermal media to be usable may include temperature-raising fluids such as steam, hot air and hot oil, etc. However, the present invention is not limited to the above-described examples. In addition, a temperature of the supplied thermal media may be appropriately selected in consideration of the means of thermal media, the raising rate of the temperature, and target temperature in raising temperature. Meanwhile, examples of the heat source to be directly supplied may include heating through electricity, and heating through gas. However, the present invention is not limited to the above-described examples.

Advantageous Effects

According to the method for preparing the super absorbent polymer, it is possible to manufacture a super absorbent polymer having improved permeability without reduction in water retention capacity or absorbency under pressure by increasing aggregation strength of the fine reassembly.

DETAILED DESCRIPTION OF THE EMBODIMENTS

Specific embodiments of the present invention will be described in more detail by way of examples. However, the examples are for illustrative purposes only, and the content of the present invention is not intended to be limited by these examples.

Preparation Examples and Comparative Preparation Examples: Manufacture Method of Fine Powder Reassembly Preparation Example 1

40 g of fine powder having a particle diameter of 150 μm or less were mixed using a rotary mixer while injecting 50 g of water having a low temperature by spraying, thereby performing reassembly. The hydrogelated fine powder reassembly was dried at 180° C. for 30 minutes to manufacture a dried fine powder reassembly having a moisture content of 3% or less. The dried fine powder reassembly was pulverized and classified to obtain a fine powder reassembly having a particle diameter ranging from 150 to 850 μm.

Preparation Example 2

A fine powder reassembly was obtained in the same manner as in Preparation Example 1, except that 40 g of fine powder having a particle diameter of 150 μm or less was mixed while injecting 40 g of water having a low temperature by spraying.

Preparation Example 3

A fine powder reassembly was obtained in the same manner as in Preparation Example 1, except that 40 g of fine powder having a particle diameter of 150 μm or less was mixed while injecting 30 g of water having a low temperature by spraying.

Comparative Preparation Example 1

A fine powder reassembly was obtained in the same manner as in Preparation Example 1, except that 40 g of fine powder having a particle diameter of 150 μm or less was mixed while injecting 50 g of water having a high temperature by spraying.

Comparative Preparation Example 2

A fine powder reassembly was obtained in the same manner as in Preparation Example 1, except that 40 g of fine powder having a particle diameter of 150 μm or less was mixed while injecting 40 g of water having a high temperature by spraying.

Comparative Preparation Example 3

A fine powder reassembly was obtained in the same manner as in Preparation Example 1, except that 40 g of fine powder having a particle diameter of 150 μm or less was mixed while injecting 30 g of water having a high temperature by spraying.

TABLE 1

|  | fine powder (g) | Water (g) | Moisture content (%) | Temperature (° C.) |
| --- | --- | --- | --- | --- |
| Preparation Example 1 | 40 | 50 | 43 | 20 |
| Preparation Example 2 | 40 | 40 | 48 |  |
| Preparation Example 3 | 40 | 30 | 58 |  |

TABLE 1-continued

|  | fine powder (g) | Water (g) | Moisture content (%) | Temperature (° C.) |
|---|---|---|---|---|
| Comparative Preparation Example 1 | 40 | 50 | 44 | 80 |
| Comparative Preparation Example 2 | 40 | 40 | 50 |  |
| Comparative Preparation Example 3 | 40 | 30 | 58 |  |

Examples and Comparative Examples: Method for Preparing Super Absorbent Polymer

Example 1

100 g of acrylic monomer (water-soluble ethylene-based unsaturated monomer), 40 g of caustic soda (NaOH), and 137 g of water were mixed, and then, 0.008 g of igacure 819 (photopolymerization initiator), 0.2 g of sodium persulfate (thermal polymerization initiator), 0.5 g of polyethylene glycol diacrylate (crosslinking agent), and 0.05 g of hexanediol acrylate (crosslinking agent) were added to the mixture, thereby preparing a monomer composition. The monomer composition was irradiated with ultraviolet rays for 1 minute using a 10 mV UV lamp light source in a chamber having an internal temperature of 80° C., and further, subjected to a polymerization reaction for 2 minutes in a non-light source state. After the polymerization reaction proceeded, the resultant products were cut into particles having a size of 10 mm or less using a meat chopper, and dried at 180° C. for 30 minutes using a hot air dryer. Then, the particles were pulverized and classified to obtain a super absorbent base polymer having a particle diameter of 150 to 850 μm.

Next, 70 g of the base polymer having a particle diameter of 150 to 850 μm and 30 g of the fine powder reassembly of Preparation Example 1 were mixed, and then 0.4 g of ethylene carbonate, 3 g of water, 0.22 g of oxalic acid, and 0.02 g of DM30S were added thereto and uniformly mixed, and surface cross-linking was performed at 180° C. for 40 minutes. After pulverization, a surface-treated super absorbent polymer having a particle size of 150 to 850 μm was obtained by using a sieve.

Example 2

A super absorbent polymer was obtained in the same manner as in Example 1, except that the surface cross-linking was performed at 180° C. for 60 minutes.

Comparative Example 1

A super absorbent polymer was obtained in the same manner as in Example 1, except that 70 g of the base polymer of Example 1 was mixed with 30 g of the fine powder reassembly of Comparative Preparation Example 1, and the surface cross-linking was performed at 180° C. for 40 minutes.

Comparative Example 2

A super absorbent polymer was obtained in the same manner as in Example 1, except that 70 g of the base polymer of Example 1 was mixed with 30 g of the fine powder reassembly of Comparative Preparation Example 1, and the surface cross-linking was performed at 180° C. for 60 minutes.

Comparative Example 3

A super absorbent polymer was obtained in the same manner as in Example 1, except that the fine powder reassembly was not mixed, and the surface cross-linking was performed at 180° C. for 40 minutes using 100 g of the base polymer of Example 1.

Comparative Example 4

A super absorbent polymer was obtained in the same manner as in Example 1, except that the fine powder reassembly was not mixed, and the surface cross-linking was performed at 180° C. for 60 minutes using 100 g of the base polymer of Example 1.

Experimental Example 1: Evaluation of Physical Properties of Fine Powder Reassembly (1) Evaluation of Particle Size The particle sizes of the fine powder reassembles prepared in Preparation Examples and Comparative Preparation Examples were measured according to the EDANA WSP 220.2 method. Results thereof were shown in Table 2 below.

(2) Measurement of Free Swell Rate (FSR)

1.00 g (=W1) of the super absorbent polymer particles prepared in Examples and Comparative Examples were uniformly distributed in 25 ml of a first glass beaker. Then, 20 ml (=W2) of 0.9 wt % sodium chloride solution was dispensed with a second glass beaker, and the content of the beaker was rapidly added to the first glass beaker, and the stopwatch was pressed. The stopwatch was stopped as soon as the last drop of a salt solution to be confirmed by reflection disappearance on a liquid surface was absorbed. Here, the disappearance of the last drop on the surface is defined as a time t. Further, the free swell rates (FSRs) were calculated in accordance with Equation 1 below and shown in Table 3 below:

$$FSR(g/gs) = W2/(W1*t) \quad \text{[Equation 1]}$$

(3) Centrifuge Retention Capacity (CRC)

Water retention capacity by centrifuge retention capacity was measured on each of the super absorbent polymers of Preparation Examples and Comparative Preparation Examples according to the EDANA WSP 241.2 method, and shown in Table 3 below.

That is, the polymers having a mass of W(g) (about 0.1 g) obtained in Examples and Comparative Examples were uniformly put in an envelope made of a nonwoven fabric and sealed, and then immersed in 0.9 mass % of physiological saline solution at room temperature. After 30 minutes, the envelope was drained to 250 G for 3 minutes using a centrifuge, and a mass W2(g) of the envelope was measured. Further, the same operation was performed without using the polymer, and a mass W1(g) at that time was measured. Each mass as obtained above was used to calculate the CRC (g/g) according to Equation 2 below:

$$CRC(g/g) = \{(W2(g) - W1(g))/W(g)\} - 1 \quad \text{[Equation 2]}$$

(4) Extractable Content (EC)

Extractable contents were measured in the same manner as described in the EDANA WSP 270.2 method and shown in Table 3 below. The neutralization degree referred to in the present invention refers to a neutralization degree value calculated by the equation which is calculated at the time of measuring the extractable content.

(5) Scanning Electron Microscope (SEM) Image of Fine Reassembly

Figure 1:
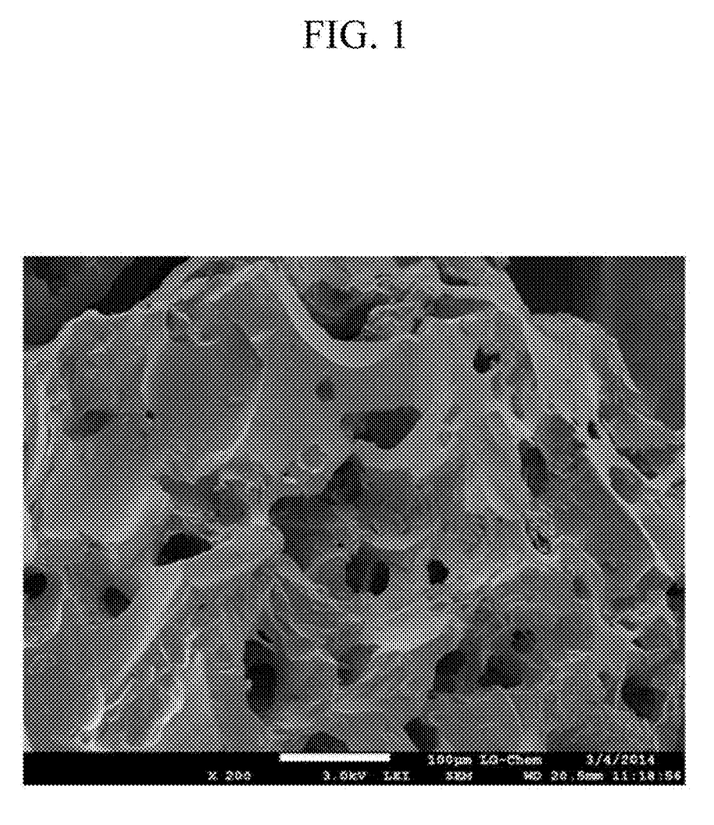
FIG. 1 is a scanning electron microscope (SEM) image of Preparation Example 1.
Figure 2:
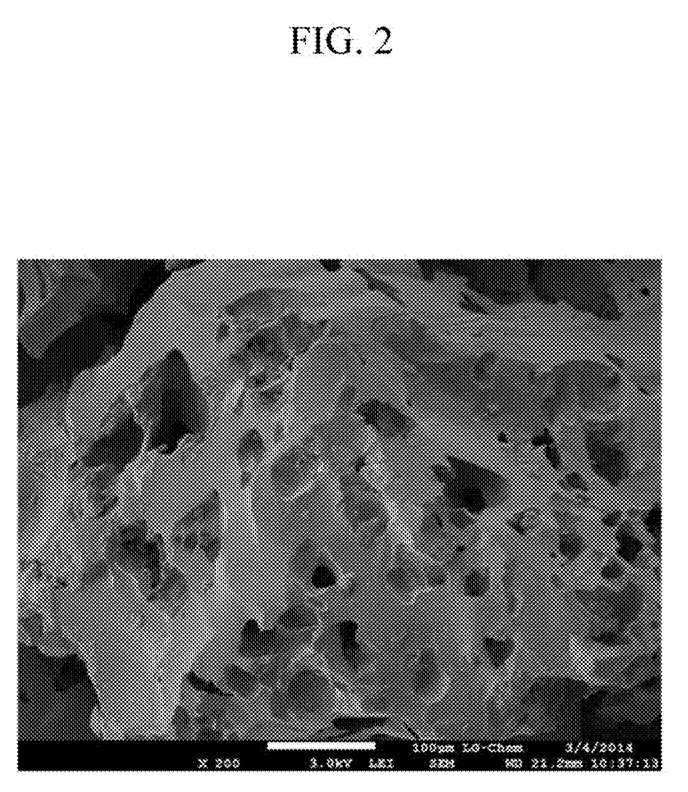
FIG. 2 is a scanning electron microscope (SEM) image of Preparation Example 2.
Figure 3:
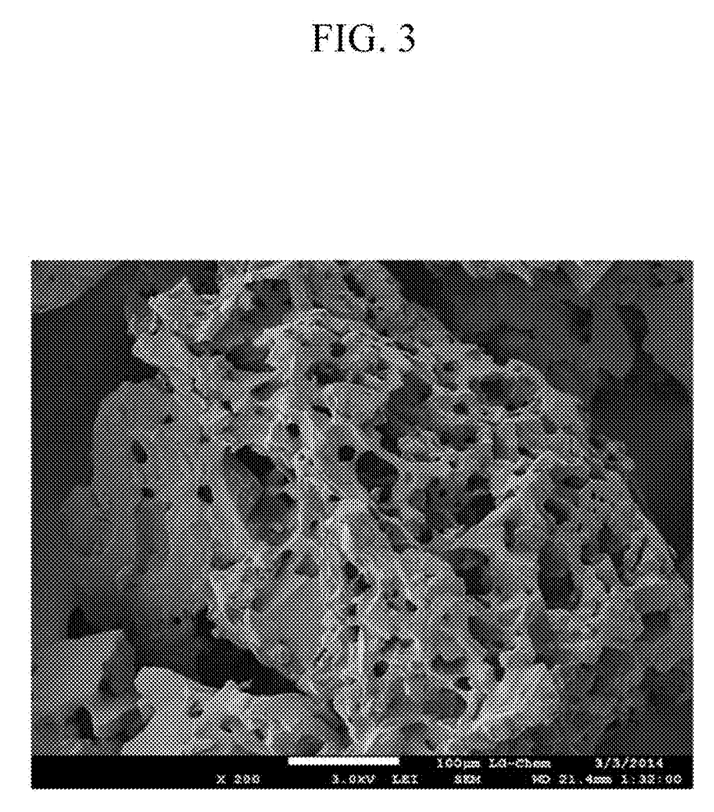
FIG. 3 is a scanning electron microscope (SEM) image of Comparative Preparation Example 3.

FIGS. 1 to 3 are scanning electron microscope (SEM) images of the fine powder reassemblys according to Preparation Examples 1 to 2 and Comparative Preparation Example 3, respectively.

Referring to FIGS. 1 to 3, when comparing Preparation Example 1 (FIG. 1) and Preparation Example 2 (FIG. 2) with Comparative Preparation Example 3 (FIG. 3), Preparation Examples 1 and 2 had smoother surface states and fewer pores. Thus, it could be appreciated that Preparation Examples 1 and 2, which used water having a low temperature in the reassembly step, had fewer pores and higher strength of fine powder reassemblys as compared to Comparative Preparation Example 3.

(6) Measurement of Crush Strength of the Fine Powder Reassembly

Power at which the super absorbent polymer single particles were pressed at a constant speed of 0.01 mm/s with a cylinder having a diameter of 8 mm was measured by a XT2plus equipment manufactured from Text Analyzer (TA). The power at which the super absorbent polymer stayed was gradually increased as the equipment went down, and when the power exceeded a predetermined value, crush occurred. In this case, the maximum force that the particles could withstand was defined as crush strength (kg Force). After the force was measured 10 times, a normal distribution curve was drawn to obtain an average while excluding 5% from the right and left. In addition, these average values were shown in Table 3 below.

TABLE 2

| | Particle (μm) ratio (%) | | | | |
|---|---|---|---|---|---|
| | 850 or more | 600 to 850 | 300 to 600 | 150 to 300 | 150 or less |
| Preparation Example 1 | 6 | 26 | 25 | 17 | 26 |
| Preparation Example 2 | 6 | 23 | 25 | 17 | 28 |
| Preparation Example 3 | 7 | 24 | 20 | 15 | 34 |
| Comparative Preparation Example 1 | 4 | 18 | 24 | 19 | 34 |
| Comparative Preparation Example 2 | 4 | 21 | 24 | 16 | 34 |
| Comparative Preparation Example 3 | 4 | 19 | 20 | 20 | 38 |

TABLE 3

| | Physical properties | | | |
|---|---|---|---|---|
| | FSR | CRC | EC | Crush strength |
| Preparation Example 1 | 0.27 | 28.1 | 12 | 0.51 (±0.32) |
| Preparation Example 2 | 0.26 | 27.6 | 12.5 | 0.33 (±0.10) |
| Preparation Example 3 | 0.36 | 28.6 | 12.7 | 0.25 (±0.08) |
| Comparative Preparation Example 1 | 0.38 | 27.2 | 11.5 | 0.34 (±0.17) |
| Comparative Preparation Example 2 | 0.38 | 27 | 12.3 | 0.24 (±0.07) |
| Comparative Preparation Example 3 | 0.48 | 27.5 | 12 | 0.21 (±0.07) |

Experimental Example 2: Evaluation of Physical Properties of Super Absorbent Polymer (1) Measurement of Absorbency Under Pressure (AUP)

Absorbency under pressure (AUP) was measured on the super absorbent polymers of Examples and Comparative Examples according to the EDANA WAP 242.2 method and shown in Table 4 below.

A simple method of measuring the absorbency under pressure (AUP) is as follows.

That is, a 400 mesh iron mesh made of stainless steel was installed in the bottom of a plastic cylinder having an inner diameter of 60 mm. 0.90 g of the absorbent polymer was uniformly sprayed on the iron mesh under the conditions of room temperature and humidity of 50%, and a piston capable of uniformly applying a load of 4.83 kPa (0.7 psi) thereon was placed, wherein an outer diameter was slightly smaller than 60 mm and there was no gap between an inner wall of the cylinder without interruption of up and down movements. At this time, a weight Wa(g) of the device was measured.

A glass filter having a diameter of 90 mm and a thickness of 5 mm was placed inside a Petro dish having a diameter of 150 mm, and a physiological saline solution containing 0.90 wt % sodium chloride was made to have the same level as an upper surface of the glass filter. One sheet of filter paper having a diameter of 90 mm was placed thereon. The measuring device was placed on a filter paper, and the liquid was absorbed under a load for 1 hour. After 1 hour, the measuring device was lifted and a weight Wb(g) thereof was measured.

Then, the absorbency under pressure was calculated from Wa and Wb according to Equation 3 below:

$$AUP(g/g)=[Wb(g)-Wa(g)]/mass(g) \text{ of absorbent polymer} \qquad [\text{Equation 3}]$$

(2) Centrifuge Retention Capacity (CRC)

Centrifuge retention capacity (CRC) of each of the super absorbent polymers of Examples and Comparative Examples was measured in the same manner as in (3) the measurement of the centrifuge retention capacity among the evaluation of physical properties of the fine reassembly, and shown in Table 4 below.

(3) Measurement of Liquid Permeability (SFC)

SFC (saline flow conductivity) refers to liquid permeability of 0.69 wt % aqueous sodium chloride solution to the absorbent polymer under a load of 2.07 kPa, and measured according to the SFC test method described in U.S. Pat. No. 5,669,894, and shown in Table 4 below.

(4) Measurement of Permeability

Permeability was measured under a load of 0.3 psi using a 0.9% brine solution according to the method described in the literature (Buchholz, F. L and Graham, A. T., "Modern Superabsorbent Polymer Technology", John Wiley&Sons (1998), page 161). 0.2 g of the sample was taken and injected into a prepared cylinder, and 50 g of 0.9% brine solution was added thereto, and the resultant product was left for 30 minutes. Then, a weight of 0.3 psi was placed on the sample in which 0.9% saline solution was absorbed, and left for 1 minute. Then, the stopcock located under the cylinder was opened, and a time required for passing the 0.9% brine solution from the upper limit to the lower limit of the cylinder was measured. All measurements were made at a temperature of 24±1° C. and a relative humidity of 50±10%. The time required for passing the solution from the upper limit to the lower limit was measured for each sample and measured without the addition of the super absorbent polymer, thereby calculating the permeability according to Equation 4 below, and results thereof were shown in Table 4 below:

Permeability(sec)=time(sample)−time(measured without injecting super absorbent resin)  [Equation 4]

TABLE 4

|  | CRC | AUP | SFC | Permeability |
|---|---|---|---|---|
| Example 1 | 27.6 | 22.9 | 78 | 52 |
| Example 2 | 26.8 | 22.6 | 87 | 47 |
| Comparative Example 1 | 27.4 | 22.8 | 66 | 60 |
| Comparative Example 2 | 26.7 | 23.1 | 79 | 50 |
| Comparative Example 3 | 29.1 | 23.2 | 56 | 79 |
| Comparative Example 4 | 27.7 | 23 | 68 | 59 |

Referring to Table 4, it could be confirmed that when the water having a low temperature was used in the manufacturing process of the fine powder reassembly as in Examples 1 and 2, it was possible to manufacture the reassemblies having excellent aggregation strength. The super absorbent polymers manufactured by mixing the polymers having a particle diameter of 150 to 850 μm with the fine powder reassembly, followed by surface cross-linking, and exhibited excellent permeability in the absorption capacity (CRC, AUP) similar to Comparative Examples.

Further, in Examples 1 and 2. since the assembly strength of the fine powder reassembly was increased, an amount at which the particle size is lowered during the transportation, pulverizing and surface cross-linking was reduced, which is advantageous in view of maintaining pores. Thus, Examples 1 and 2 had a high liquid permeability (SFC).

What is claimed is:

1. A method for preparing a super absorbent polymer comprising the steps of:
    carrying out a thermal polymerization or a photopolymerization of a monomer composition comprising a water-soluble ethylene-based unsaturated monomer and a polymerization initiator to form a hydrogel polymer;
    drying the hydrogel polymer to form a dried polymer;
    pulverizing the dried polymer to form a pulverized polymer;
    classifying the pulverized polymer into a fine powder having a particle diameter of less than 150 μm and a polymer having a particle diameter of 150 to 850 μm according to the particle diameter;
    performing reassembly by mixing and wetting the fine powder with 5 to 30° C. water in a content of 50 to 200 parts by weight with respect to 100 parts by weight of the fine powder having a particle size of 150 μm or less, to form a fine powder reassembly; and
    mixing the polymer having a particle diameter of 150 to 850 μm with the fine powder reassembly, followed by surface cross-linking,
    wherein the polymer having a particle diameter of 150 to 850 μm and the fine powder reassembly are mixed at a weight ratio of 7:3 to 8:2.

2. The manufacturing method of claim 1, wherein in the surface cross-linking, a surface cross-linking agent is used in a content of 0.001 to 5 parts by weight with respect to 100 parts by weight of the polymer having a particle diameter of 150 to 850 μm and the fine powder reassembly.

3. The manufacturing method of claim 2, wherein the surface cross-linking agent comprises at least one selected from the group consisting of a polyhydric alcohol compound; an epoxy compound; a polyamine compound; a haloepoxy compound; a condensation product of the haloepoxy compound; oxazoline compounds; mono-, di- or polyoxazolidinone compound; a cyclic urea compound; a polyvalent metal salt; and an alkylene carbonate compound.

4. The manufacturing method of claim 1, wherein the surface cross-linking is performed at a temperature of 150° C. to 300° C. for 10 minutes to 100 minutes.

5. The manufacturing method of claim 1, wherein the fine powder is mixed and wetted with the 5 to 30° C. water using a mist or a spray device.

6. The manufacturing method of claim 1, wherein in the performing of the reassembly, the fine powder is reassembled in a state in which a moisture content is 40 to 60 wt %.

7. The manufacturing method of claim 1, wherein a moisture content of the hydrogel polymer is 40 to 60 wt %.

8. The manufacturing method of claim 1, wherein a moisture content of the dried polymer is 0.1 to 10 wt %.

* * * * *